(12) United States Patent
Fink

(10) Patent No.: US 12,298,134 B2
(45) Date of Patent: May 13, 2025

(54) APPROACHES OF OBTAINING GEOSPATIAL COORDINATES OF SENSOR DATA

(71) Applicant: Palantir Technologies Inc., Denver, CO (US)

(72) Inventor: Robert Fink, Munich (DE)

(73) Assignee: Palantir Technologies Inc., Denver, CO (US)

( * ) Notice: Subject to any disclaimer, the term of this patent is extended or adjusted under 35 U.S.C. 154(b) by 358 days.

(21) Appl. No.: 17/744,221

(22) Filed: May 13, 2022

(65) Prior Publication Data

US 2022/0412737 A1 Dec. 29, 2022

Related U.S. Application Data

(60) Provisional application No. 63/214,165, filed on Jun. 23, 2021.

(51) Int. Cl.
*G01C 11/28* (2006.01)
*G01C 11/02* (2006.01)
(Continued)

(52) U.S. Cl.
CPC .............. *G01C 11/28* (2013.01); *G01C 11/02* (2013.01); *G01S 17/894* (2020.01); *G06T 17/05* (2013.01)

(58) Field of Classification Search
CPC ....... G01C 11/02; G01C 11/28; G01S 17/894; G06T 17/05; G06T 2207/10016;
(Continued)

(56) References Cited

U.S. PATENT DOCUMENTS 11,187,793 B1 * 11/2021 Liu ...................... G05D 1/0214
2013/0124148 A1 * 5/2013 Jin ............................ G06T 7/55
703/1

(Continued)

FOREIGN PATENT DOCUMENTS

CN 105847750 B 1/2019

OTHER PUBLICATIONS

Yuping Lin et al., "Efficient detection and tracking of moving objects in geo-coordinates," Apr. 20, 2010, Machine Vision and Applications (2011)22,pp. 505-519.*

(Continued)

*Primary Examiner* — Omar S Ismail
(74) *Attorney, Agent, or Firm* — Sheppard Mullin Richter & Hampton LLP

(57) ABSTRACT

Systems and methods are provided for one or more processors; and memory storing instructions that, when executed by the one or more processors, cause the system to perform: receiving successive frames of sensor data, the successive frames comprising a first frame and a second frame; determining transformations, in sensor coordinates, between coordinates of corresponding elements in the successive frames; determining a mapping between the transformations in sensor coordinates and transformations in geospatial coordinates of the corresponding elements in the successive frames; and determining second geospatial coordinates of the corresponding elements of a third frame based on: a transformation between the second frame and the third frame, and the mapping.

18 Claims, 11 Drawing Sheets

(51) Int. Cl.
*G01S 17/894* (2020.01)
*G06T 17/05* (2011.01)

(58) Field of Classification Search
CPC . G06T 2207/20021; G06T 2207/30181; G06T 7/70
See application file for complete search history.

(56) References Cited

U.S. PATENT DOCUMENTS

| | | | | |
|---|---|---|---|---|
| 2014/0300637 | A1* | 10/2014 | Fan | G06T 7/75 382/100 |
| 2014/0300775 | A1* | 10/2014 | Fan | H04N 23/95 348/222.1 |
| 2015/0354976 | A1* | 12/2015 | Ferencz | G05D 1/0253 382/104 |
| 2016/0019434 | A1* | 1/2016 | Caldwell | G06V 10/462 345/474 |
| 2017/0039765 | A1* | 2/2017 | Zhou | G06T 7/521 |
| 2017/0244937 | A1* | 8/2017 | Meier | H04N 23/66 |
| 2018/0292214 | A1* | 10/2018 | Zhang | G01S 19/14 |
| 2018/0329418 | A1* | 11/2018 | Baalke | G16Z 99/00 |
| 2019/0137287 | A1* | 5/2019 | Pazhayampallil | G05D 1/0291 |
| 2019/0243372 | A1* | 8/2019 | Huval | G05D 1/0221 |
| 2020/0001779 | A1* | 1/2020 | Alexander | G06V 20/584 |
| 2020/0159244 | A1* | 5/2020 | Chen | G01S 17/89 |
| 2020/0175284 | A1* | 6/2020 | Viswanathan | G06T 7/97 |
| 2020/0284883 | A1* | 9/2020 | Ferreira | G01S 17/10 |
| 2021/0012119 | A1* | 1/2021 | Shamshiri | G06F 18/24765 |
| 2022/0012461 | A1* | 1/2022 | Ehrlich | G06V 10/255 |

OTHER PUBLICATIONS

Asaad Hakeem et al., "Estimating Geospatial Trajectory of a Moving Camera," Sep. 18, 2006, 18th International Conference on Pattern Recognition (ICPR'06), pp. 1-5.*

Jiangjian Xiao et al., "Geo-spatial Aerial Video Processing for Scene Understanding and Object Tracking," Aug. 5, 2008, 2008 IEEE Conference on Computer Vision and Pattern Recognition, pp. 1-7.*

Extended European Search Report dated Nov. 28, 2022, issued in related European Patent Application No. 22175563.0 (8 pages).

Ahmed NASSAR et al., "A Deep CNN-Based Framework for Enhanced Aerial Imagery Registration with Applications to UAV Geolocalization", 2018 IEEE/CVF Conference on Computer Vision and Pattern Recognition Workshops (CVPRW), IEEE, Jun. 18, 2018, pp. 1594-159410.

* cited by examiner

APPROACHES OF OBTAINING GEOSPATIAL COORDINATES OF SENSOR DATA

CROSS REFERENCE TO RELATED APPLICATION

This application claims the benefit under 35 U.S.C. § 119(e) from U.S. Application No. 63/214,165, filed Jun. 23, 2021, the content of which is hereby incorporated by reference in its entirety.

FIELD OF THE INVENTION

This disclosure relates to approaches of obtaining geospatial, or real-world, coordinates of an image or video when such coordinates cannot be directly obtained.

BACKGROUND

Typically, geospatial, or real-world, coordinates of sensor data, such as from an image sensor, an infrared sensor, or a Lidar sensor, may be obtained, for example, using a Global Positioning System (GPS) sensor. However, in certain places such as tunnels, GPS signals may be unavailable or unreliable, thus causing a loss of the geospatial coordinates in those frames of sensor data. Although current techniques may estimate geospatial coordinates in those frames using previous and/or subsequent frames that have geospatial coordinates, such techniques may be inaccurate.

SUMMARY

Various embodiments of the present disclosure can include computing systems, methods, and non-transitory computer readable media configured to obtain or estimate (hereinafter "obtain") geospatial coordinates of a frame of sensor data. The computing system, methods, and non-transitory computer readable media may perform: receiving successive frames of sensor data, the successive frames comprising a first frame and a second frame; determining transformations, in sensor coordinates, between coordinates of corresponding elements in the successive frames; determining a mapping between the transformations in sensor coordinates and transformations in geospatial coordinates of the corresponding elements in the successive frames; and determining second geospatial coordinates of the corresponding elements of a third frame based on: a transformation between the second frame and the third frame, and the mapping.

In some embodiments, the successive frames further comprise a fourth frame captured before the first frame, and the mapping is determined based on the transformations in sensor coordinates of the corresponding elements between the fourth frame and the first frame, and between the first frame and the second frame.

In some embodiments, the geospatial coordinates and the second geospatial coordinates comprise GPS (Global Positioning System) coordinates in longitude and latitude; and the determination of the second geospatial coordinates is in response to determining that a GPS signal is unavailable or inaccurate during the capturing of the third frame.

In some embodiments, the instructions further cause the system to perform: determining that the corresponding elements are stationary; and the determination of the translations is in response to determining that the corresponding elements are stationary.

In some embodiments, the instructions further cause the system to perform: determining first geospatial coordinates corresponding to a first time when the first frame was captured; and determining second geospatial coordinates corresponding to a second time when the second frame was captured; and wherein: the mapping comprises an angle and a scaling factor indicating that a given transformation in sensor coordinates is rotated and scaled into a second transformation in geospatial coordinates.

In some embodiments, the instructions further cause the system to perform: dividing each of the successive frames into segments; determining transformations, in sensor coordinates, between coordinates of corresponding elements in each of the segments in the successive frames; determining a mapping between the transformations in sensor coordinates and transformations in geospatial coordinates of the corresponding elements in each of the segments in the successive frames; and determining second geospatial coordinates of the corresponding elements in each of the segments of a third frame based on: transformations of each of the segments between the second frame and the third frame, and the mapping; and the determination of the second geospatial coordinates of the third frame is based on a centroid of the determined second geospatial coordinates in each of the segments.

In some embodiments, the sensor data comprises camera data, infrared sensor data, or Lidar data.

In some embodiments, in response to the sensor data comprising camera data, the elements comprise pixels.

In some embodiments, the determination of the mapping comprises an adjustment for a curvature of the Earth.

These and other features of the computing system, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

In FIGS. 2A-2C, elements or objects in successive frames are translated. In FIGS. 3A-3C, elements or objects in successive frames are additionally transformed using other transformation operations such as rotation and/or scaling. In FIG. 4, frames of Lidar point clouds are shown.

DETAILED DESCRIPTION

Occasionally, when sensor data is obtained, the GPS locations are inaccurate or missing. Existing approaches to estimate the GPS locations, such as averaging known GPS locations from previous and subsequent frames of the sensor data, may be inaccurate and fail to account for sensor operations such as zooming or rotation of the sensor. To address shortcomings, a new approach accurately determines GPS locations when such GPS locations are inaccurate or missing, while conserving computational costs. Such an approach accurately accounts for different sensor operations such as zooming or rotation, and is applicable to a range of sensor data, including, for example, image sensor data from cameras or infrared sensors, or Lidar data. In this new approach, sensor data from different frames may be analyzed to determine a change in translation, rotation, zooming, and/or other operations, between successive frames. In the frames that have known GPS data, changes in GPS coordinates are determined. Thus, in the frames having known GPS data, a change in GPS coordinates may be mapped to changes in translation, rotation, zooming, and/or other operations, between successive frames. Using such a mapping relationship, a change in GPS coordinates between a frame having a known GPS coordinate and a successive frame having an unknown GPS coordinate may be determined, in order to determine GPS coordinates of the frame previously having missing or inaccurate GPS data.

Figure 1:
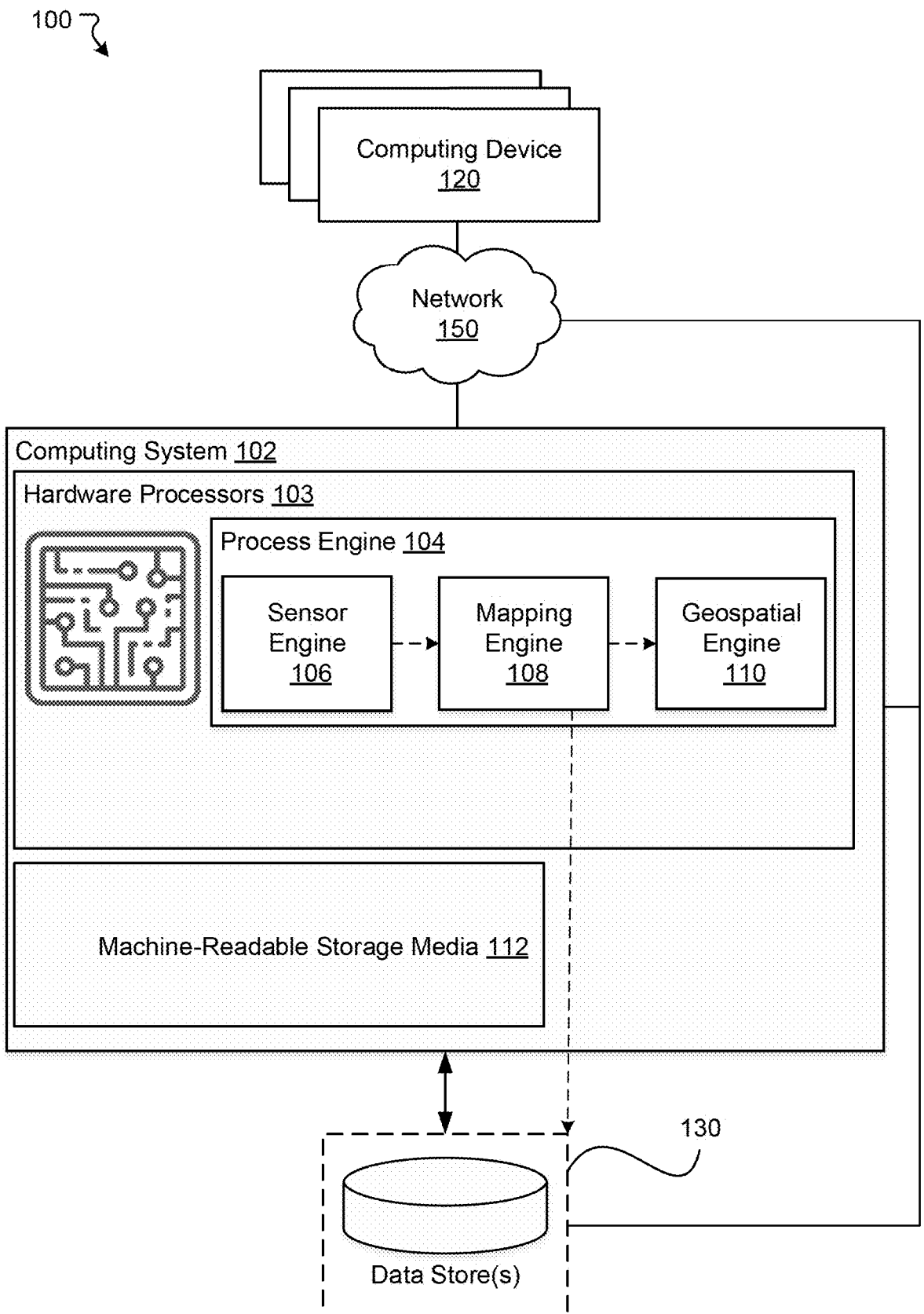
FIG. 1 illustrates an example computing environment, in accordance with various embodiments of the present technology.

FIG. 1 illustrates an example environment 100, in accordance with various embodiments, of a computing system that determines, obtains, or retrieves GPS coordinates of a frame of sensor data that is missing accurate GPS data. The example environment 100 can include at least a computing system 102 and at least one computing device 120. The computing system 102 and the computing device 120 can each include one or more processors and memory. The processors can be configured to perform various operations by interpreting machine-readable instructions, for example, from a machine-readable storage media 112. The processors can include one or more hardware processors 103 of the computing system 102 that can be configured to capture frames of sensor data, analyze the frames to determine transformations, such as translations, rotations, zooming, and/or other operations, between successive frames, map the determined transformations to transformations of GPS coordinates corresponding to the successive frames, and determine GPS coordinates of a frame that is missing accurate GPS data, using the mapped transformations and known GPS coordinates of an immediate previous or subsequent frame.

As shown in FIG. 1, the one or more hardware processors can include a process engine 104. The process engine 104 may include a sensor engine 106, a mapping engine 108, and a geospatial engine 110. The process engine 104 may be executed by the hardware processor(s) 103 of the computing system 102 to perform various operations including those operations described in reference to the sensor engine 106, the mapping engine 108, and the geospatial engine 110. In general, the process engine 104 may be implemented, in whole or in part, as software that is capable of running on one or more computing devices or systems. In one example, the process engine 104 may be implemented as or within a software application running on one or more computing devices (e.g., user or client devices) and/or one or more servers (e.g., network servers or cloud servers). In some instances, various aspects of the sensor engine 106, the mapping engine 108, and the geospatial engine 110 may be implemented in one or more computing systems and/or devices.

The environment 100 may also include one or more data stores 130 accessible to the computing system 102. The data stores 130 may be accessible to the computing system 102 either directly or over a network 150. In some embodiments, to maintain data security, the decrypted, encrypted, and/or re-encrypted data accessed and processed by the process engine 104 may be deleted before the data is transmitted to the data stores 130.

In general, a user operating a computing device 120 can interact with the computing system 102 over the network 150, for example, through one or more graphical user interfaces and/or application programming interfaces. In some instances, one or more of the sensor engine 106, the mapping engine 108, and the geospatial engine 110 may be combined or integrated into a single processor, and some or all functions performed by one or more of the aforementioned engines may not be spatially separated, but instead may be performed by a common processor.

The process engine 104 can be configured to process requests received from the computing device 120. For example, the requests may be generated based on operations performed by a user operating the computing device 120 or from a software application or embedded machine running on the computing device 120. In various embodiments, such requests may include requests to determine GPS coordinates of a frame of sensor data. The frames of sensor data may be inputted by a user operating the computing device 120, or otherwise retrieved, for example, from the data stores 130.

Figure 2A:
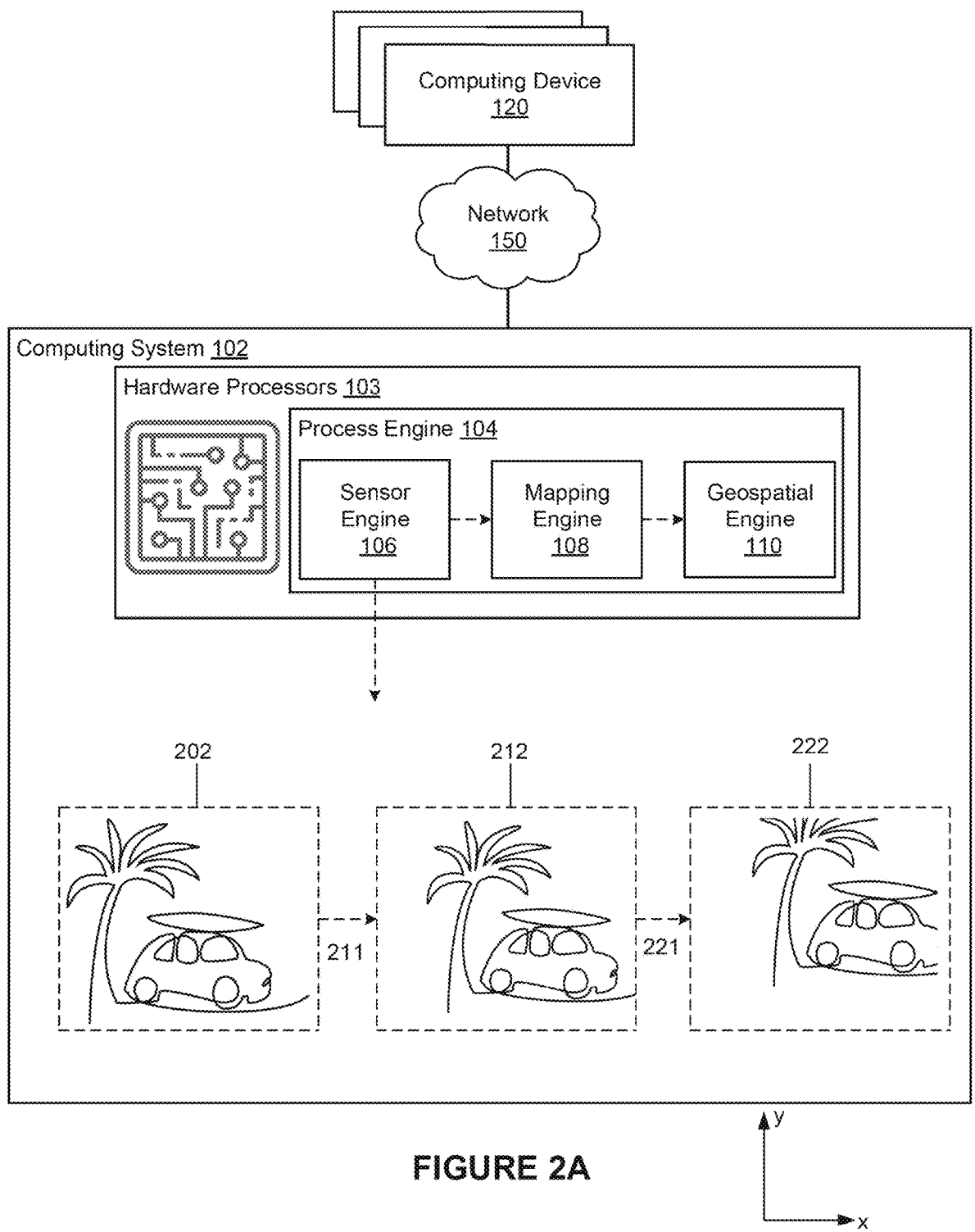
FIGS. 2A-2C, 3A-3C, and 4 illustrate exemplary implementations of a computing system, in accordance with various embodiments of the present technology.

FIG. 2A illustrates an operation of the sensor engine 106. The sensor engine 106 may capture frames 202, 212, and 222 of sensor data. In FIG. 2A, the sensor data is illustrated to include camera data, though data of other sensors are also applicable, as will be illustrated, for example, in FIG. 4. In other embodiments, the frames 202, 212, and 222 may have already been captured, and the sensor engine 106 merely analyzes or processes the frames 202, 212, and 222. The sensor engine 106 may determine a transformation 211 between the successive frames 202 and 212, and a transformation 221 between the successive frames 212 and 222. The transformation 211 may be determined for given corresponding elements between the successive frames 202 and 212, such as, an identical tree illustrated in both the successive frames 202 and 212. As illustrated in FIG. 2A, the transformations include translations with respect to a x-axis and a y-axis, though other transformations such as rotations and/or zooming may also be applicable, as will be illustrated, for example, in FIGS. 3A-3C. As illustrated in FIG. 2A, each corresponding element, or pixel, of the successive frames 212 and 222 may be translated by a same amount. However, if some of the elements are translated by different amounts, an average translation may be obtained over all the elements. As only an illustrate example, the transformation 211 may include a translation of 3 units in the x-direction and 1 unit in the y-direction, while the transformation 221 may include a translation of 2 units in the x-direction and 3 units in the y-direction.

In some embodiments, the transformations as previously described may only be determined for stationary elements.

The sensor engine 106 may determine which elements are stationary, meaning that they are not themselves moving with respect to a stationary frame. For example, a tree may be stationary, while an airplane may be moving. The sensor engine 106 may determine bounding regions such as bounding boxes over any stationary and/or moving elements.

To determine the bounding regions, the sensor engine 106 may determine multiple overlapping bounding regions using a neural network and/or a you only look once (YOLO) algorithm. The overlapping bounding regions may be sorted based on their respective scores indicating a likelihood or probability that the bounding regions contain a particular feature in question, for example, a tree, without also extending too far beyond the particular feature in question. In some embodiments, only a single bounding region, out of the bounding regions, having a highest score may be selected via Non-Maximum Suppression to remove overlapping and redundant bounding regions.

In some embodiments, elements near boundaries of the frames 202, 212, and 222 may be inaccurate due to lighting or texture changes, and/or obfuscation or invisible elements. Such elements may be disregarded during the determination of the transformations by the sensor engine 106. In some embodiments, the sensor engine 106 may scale down the frames 202, 212, and 222 to save computational cost.

In some embodiments, the sensor engine 106 may adjust the determined transformations between successive frames to account for a spherical shape of the Earth. Such an adjustment may be determined based on a field of view of the frames 202, 212, and 222. For example, if the field of view is large, then a larger adjustment may be needed because an assumption of a flat earth may be less accurate. In some embodiments, the sensor engine 106 may additionally adjust for aberration of a sensor capturing the frames 202, 212, and 222, such as a lens of a camera sensor.

Figure 2B:
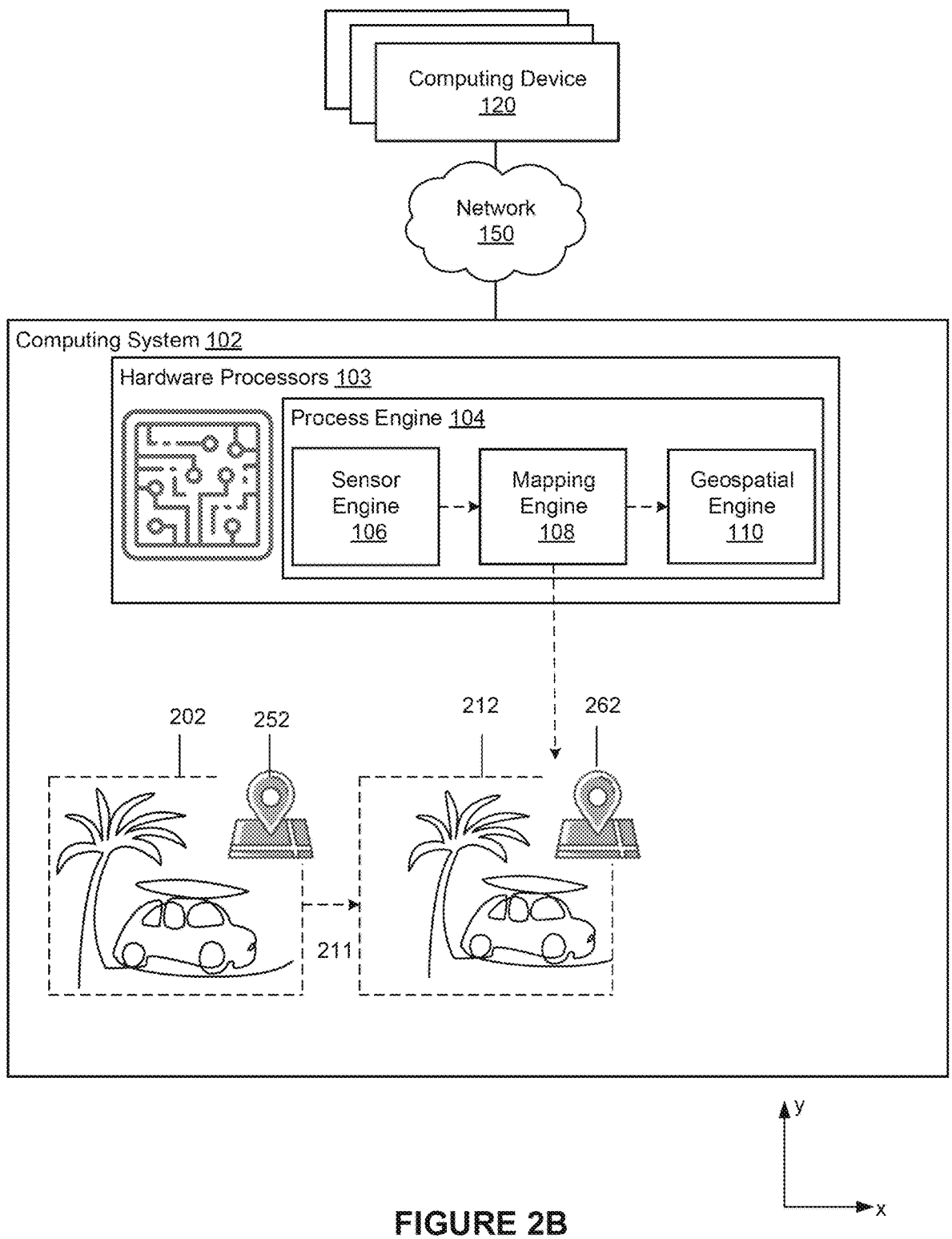

FIG. 2B illustrates an operation of the mapping engine 108. In FIG. 2B, GPS coordinates 252 and 262, respectively, of the successive frames 202 and 212 are known. In some embodiments, the GPS coordinates 252 and 262 may correspond to centers of the successive frames 202 and 212, respectively. Thus, the mapping engine 108 may obtain or derive a mapping or model (hereinafter "mapping") between the transformation 211 and changes in the GPS coordinates 252 and 262. In particular, the mapping engine 108 may associate or correlate a transformation in a x-direction between the successive frames 202 and 212 to a particular angle change and a scaling factor needed to transform from the GPS coordinates 252 to the GPS coordinates 262 between the successive frames 202 and 212. Similarly, the mapping engine 108 may associate or correlate a transformation in a y-direction between the successive frames 202 and 212 to a particular angle change and a scaling factor needed to transform from the GPS coordinates 252 to the GPS coordinates 262 between the successive frames 202 and 212. In some embodiments, the GPS coordinates 252 and 262 may include longitude and latitude coordinates. In some embodiments, the GPS coordinates may include WGS (World Geodetic System) 84 coordinates or UTM (Universal Transverse Mercator) coordinates. If a frame rate of capturing successive frames is much higher than a GPS refresh or capture rate, GPS coordinates corresponding to each of the successive frames may be estimated or obtained using interpolation.

Although the mapping is illustrated as being determined using only two successive frames 202 and 212, the mapping may be obtained using more than two successive frames. In some examples, the mapping may be obtained using successive frames previous to the frame 202, and/or frames subsequent to the frame 222. The mappings between each of the successive frames may then be averaged and outliers may be removed.

Mappings may be stored, for example, in the data stores 130. The mappings may be associated with particular GPS coordinates and a particular perspective or angle from which the sensor is capturing sensor data. Thus, when a same location is revisited at a same perspective, the mapping may be reused, and the mapping engine 108 may not need to re-determine a mapping.

Figure 2C:
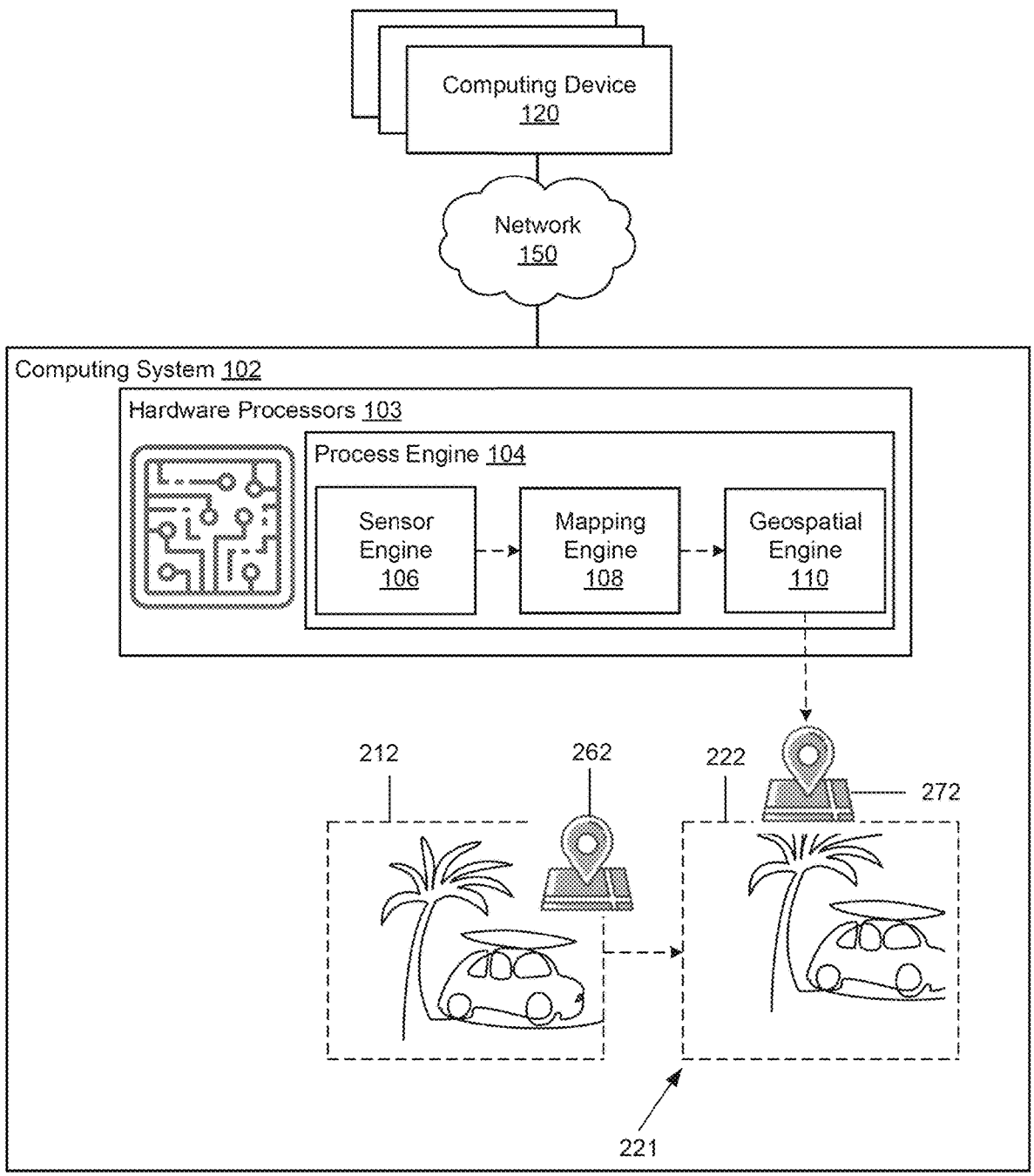

FIG. 2C illustrates an operation of the geospatial engine 110. In FIG. 2C, the geospatial engine 110 may determine GPS coordinates 272 of the frame 222. During the capture of the frame 222, GPS signal data may otherwise be missing or unreliable. The geospatial engine 110 may determine the GPS coordinates 272 of the frame 222 by taking the GPS coordinates 262 of the most recent previous frame 212 and applying the mapping derived from the mapping engine 108, along with the known transformation 221 between the successive frames 212 and 222. In other words, the geospatial engine 110 may determine how much of a change in GPS coordinates resulted from the transformation 221, and apply that change to the known GPS coordinates 262. In FIG. 2C, the frame 222 is illustrated as being subsequent to the frames 212 and 202. The GPS coordinates 272 are illustrated as being obtained using the mapping derived from previous, or earlier, frames. However, the GPS coordinates 272 may, alternatively or additionally, be obtained using frames subsequent to the frame 222.

Figure 3A:
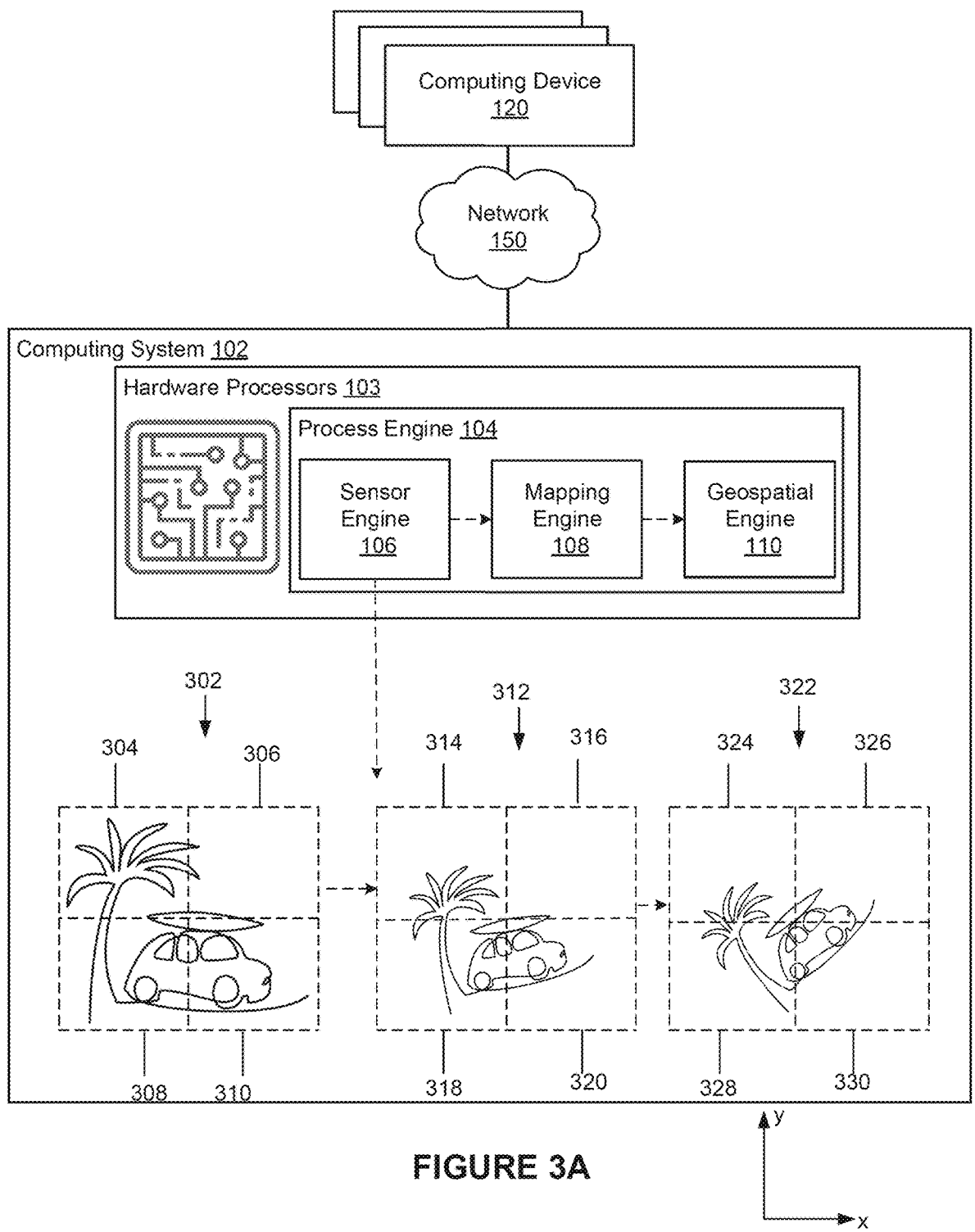

FIG. 3A illustrates an operation of the sensor engine 106. The sensor engine 106 may capture frames 302, 312, and 322 of sensor data. In FIG. 3A, the sensor data is illustrated to include camera data, and the data between the successive frames 302, 312, and 322 may have been additionally transformed by rotation and/or scaling. In other embodiments, the frames 302, 312, and 322 may have already been captured, and the sensor engine 106 merely analyzes or processes the frames 302, 312, and 322. The sensor engine 106 may segment the frames 302, 312, and 322 into segments. Although four segments, or quadrants, are illustrated in FIG. 3A, any number of segments may be used. For example, in some embodiments, a number of segments may be nine, sixteen, twenty five, or any squares of integers. The sensor engine 106 may determine transformations between quadrants 304 and 314 of the successive frames 302 and 312, between quadrants 306 and 316 of the successive frames 302 and 312, between quadrants 308 and 318 of the successive frames 302 and 312, and between quadrants 310 and 320 of the successive frames 302 and 312. Furthermore, the sensor engine 106 may determine transformations between quadrants 314 and 324 of the successive frames 312 and 322, between quadrants 316 and 326 of the successive frames 312 and 322, between quadrants 318 and 328 of the successive frames 312 and 322, and between quadrants 320 and 330 of the successive frames 312 and 322. The process of determining the transformations may be same or similar to that described with respect to FIG. 2A. The transformations may include a translation vector between each of the respective quadrants. If some of the elements within a quadrant are translated by different amounts, an average translation may be obtained over all the elements in that quadrant.

Figure 3B:
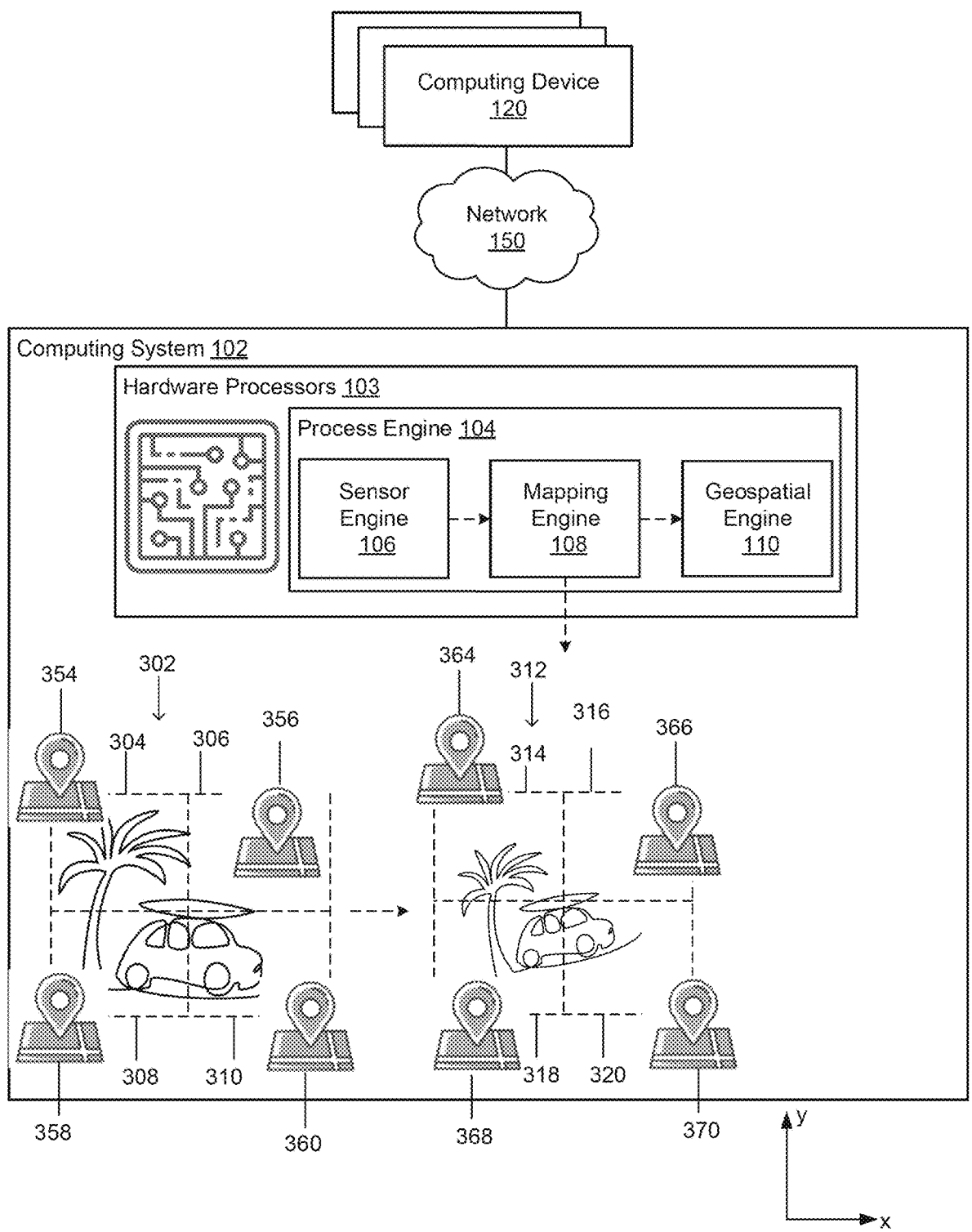

FIG. 3B illustrates an operation of the mapping engine 108. In FIG. 3B, GPS coordinates 354, 356, 358, and 360, of the respective quadrants 304, 306, 308, and 310, may be known and/or derived. For example, GPS coordinates of a center of the frame 302 and of the corners may be known, and GPS coordinates 354, 356, 358, and 360 may be obtained using interpolation. In some embodiments, the GPS coordinates 354, 356, 358, and 360 may correspond to centers of the respective quadrants 304, 306, 308, and 310, respectively. Similarly, GPS coordinates 364, 366, 368, and 370, of the respective quadrants 314, 316, 318, and 320, may be known and/or derived. Thus, the mapping engine 108 may obtain or derive a mapping or model (hereinafter "mapping") between the transformation and changes in the GPS coordinates of each quadrant. In particular, the mapping engine 108 may associate or correlate a transformation in a x-direction of each quadrant 304, 306, 308, and 310 and 314, 316, 318, and 320 of the successive frames 302 and 312 to a particular angle change and a scaling factor needed to transform from the GPS coordinates 354, 356, 358, 360 to the GPS coordinates 364, 366, 368, 370 between the successive frames 302 and 312. The mapping of each quadrant (e.g., 304 to 314, 306 to 316, 308 to 318, and 310 to 320) may be determined individually. Principles described with respect to FIG. 2B may also be applicable to FIG. 3B, but in FIG. 3B, these principles are applied to each quadrant rather than an entire frame. In some embodiments, the GPS coordinates 252 and 262 may include longitude and latitude coordinates. In some embodiments, the GPS coordinates may include WGS (World Geodetic System) 84 coordinates or UTM (Universal Transverse Mercator) coordinates.

Figure 3C:
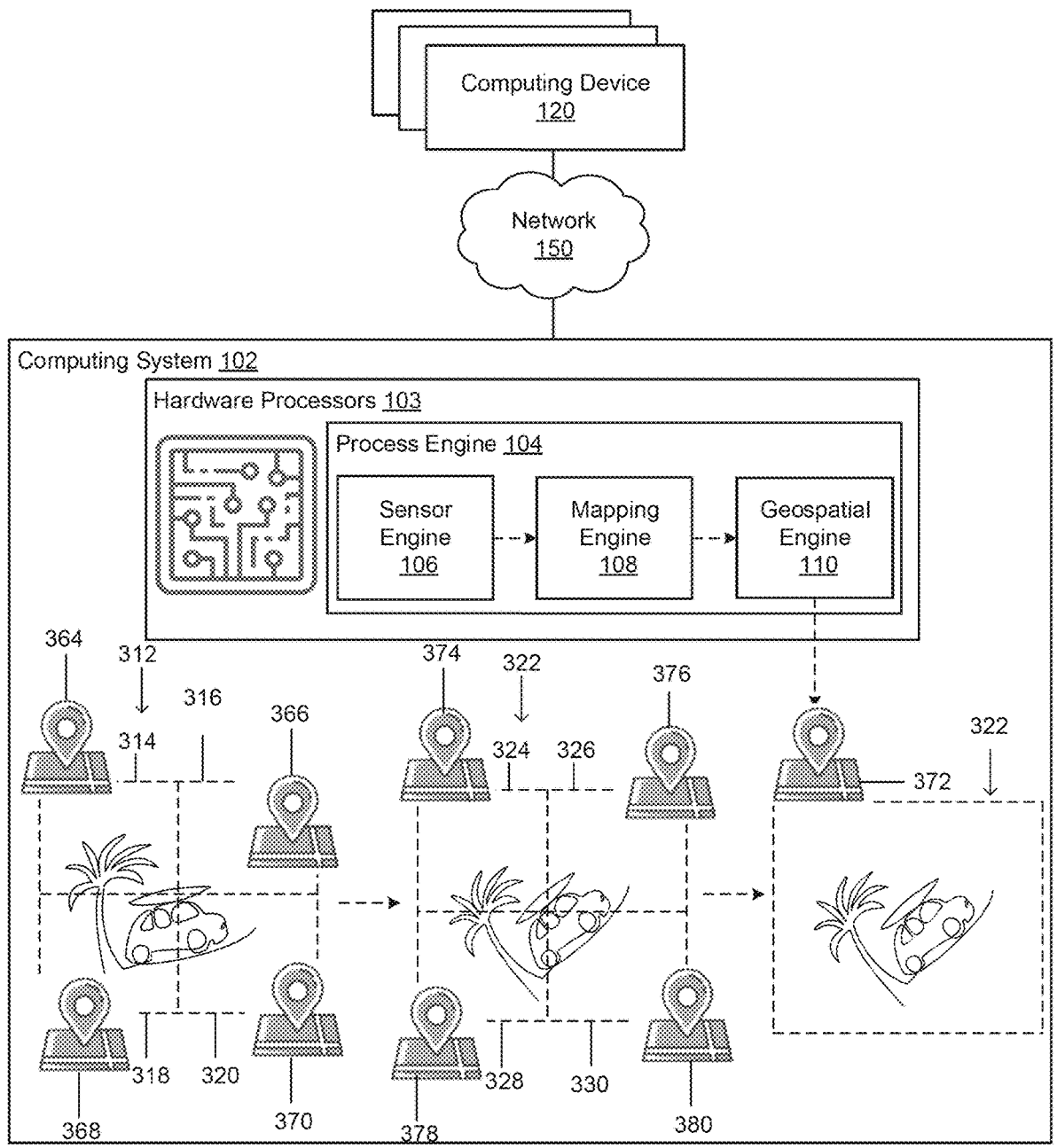

FIG. 3C illustrates an operation of the geospatial engine 110. In FIG. 3C, the geospatial engine 110 may determine GPS coordinates 374, 376, 378, and 380 of the quadrants 324, 326, 328, and 330, respectively, of the frame 322. During the capture of the frame 322, GPS signal data may otherwise be missing or unreliable. The geospatial engine 110 may determine the GPS coordinates 374, 376, 378, and 380 of the quadrants 324, 326, 328, and 330 by taking the GPS coordinates 364, 366, 368, and 370 of the most recent previous frame 312 and applying the mapping derived from the mapping engine 108, along with the known transformations between the quadrants of the successive frames 312 and 322. In other words, the geospatial engine 110 may determine how much of a change in GPS coordinates resulted from the known transformations in each quadrant, and apply those changes to the known GPS coordinates 364, 366, 368, and 370. The geospatial engine 110 may then take an average of the obtained GPS coordinates 374, 376, 378, and 380, to obtain GPS coordinates 372 of the overall frame 322. Other principles illustrated in FIG. 2C may also be applicable to FIG. 3C.

Figure 4:
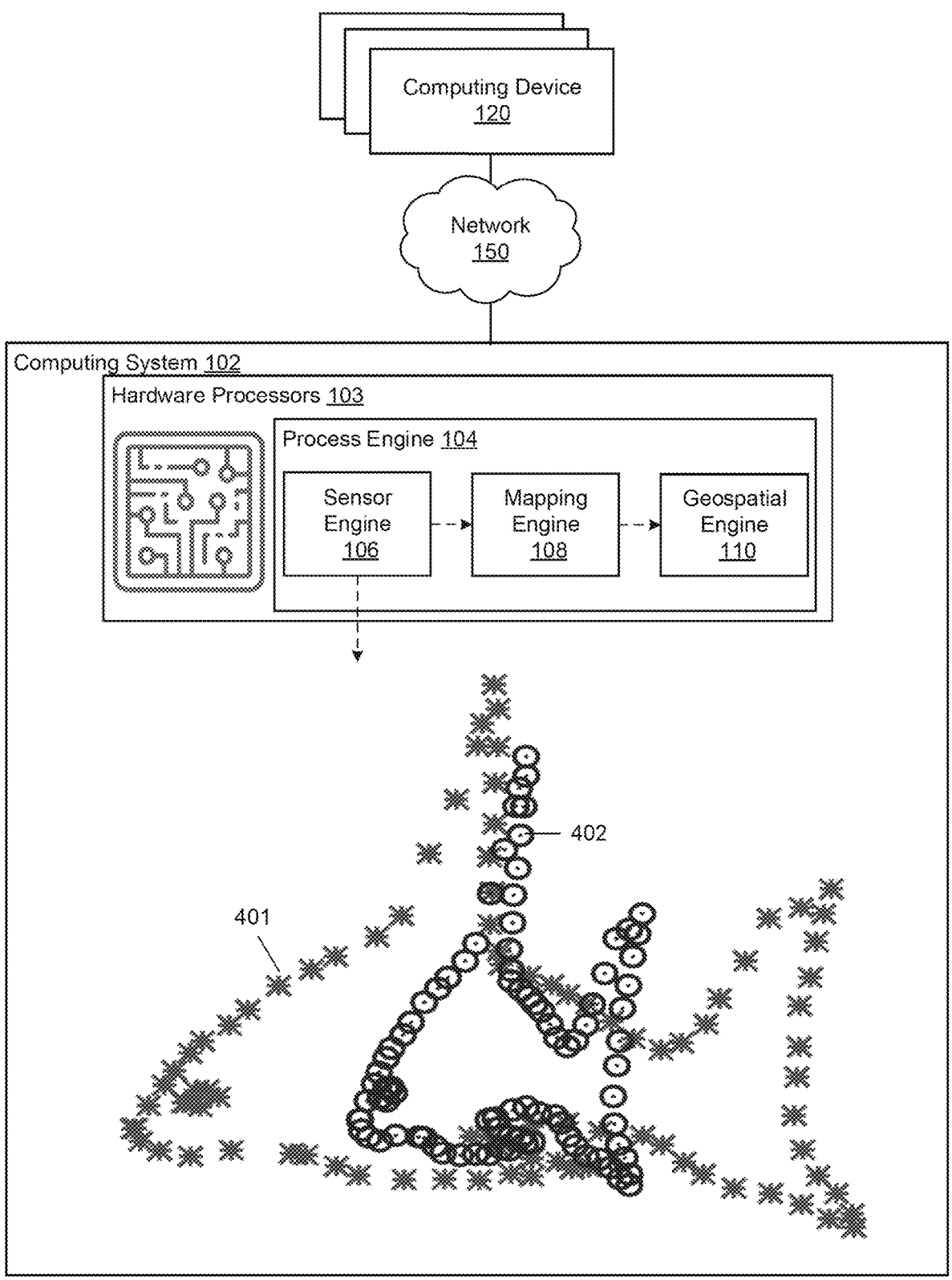
Figure 4:
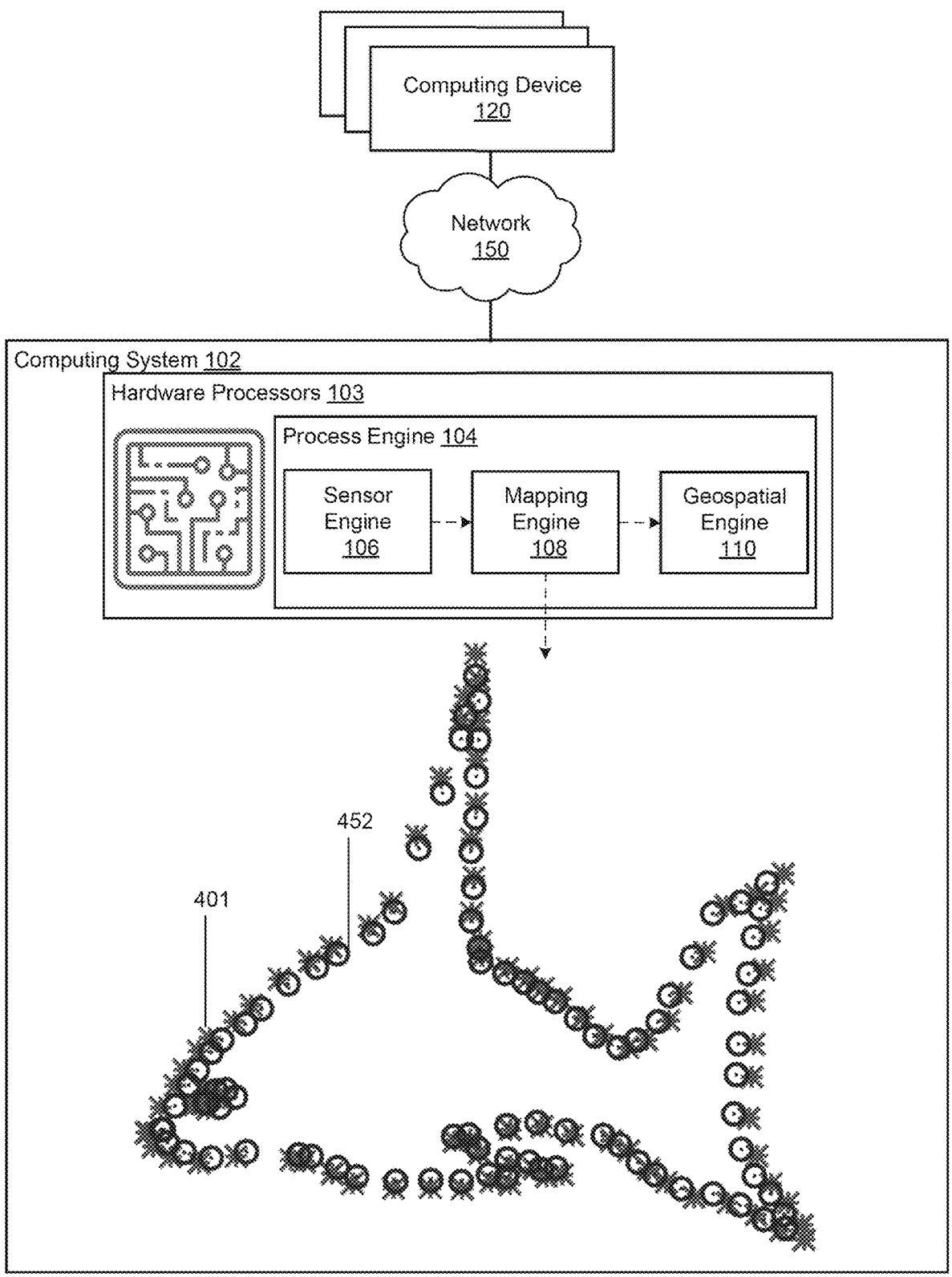

FIG. 4 illustrates an operation of the sensor engine 106. The sensor engine 106 may capture frames (e.g., point clouds) 401 and 402 of Lidar sensor data. In other embodiments, the frames 401 and 402 may have already been captured, and the sensor engine 106 merely analyzes or processes the frames 401 and 402. In FIG. 4, the point clouds 401 and 402 are initially unaligned and/or have different origins. The sensor engine 106 may determine a transformation between the point clouds 401 and 402 using point cloud registration. The transformation may include a translation and a rotation of the point cloud 402 to align with the point cloud 401 as closely as possible. Here, the point cloud 401 may be a source, or an earlier point cloud, and the point cloud 402 may be a target, or a later point cloud that is transformed to be aligned with the point cloud 401. Following the point cloud registration, the point cloud 402 may be transformed into point cloud 452. Thus, the sensor engine 106 may determine a matrix indicating a transformation between the point clouds 402 and 452.

The mapping engine 108 may then determine a mapping indicating how a translation in point cloud coordinates is associated with a change in GPS coordinates, and how a rotation in point cloud coordinates is associated with a change in GPS coordinates. Because the point cloud illustrated in FIG. 4 is three-dimensional, an additional rotation component of the transformation may be used. Relevant principles illustrated in FIGS. 2A-2C and 3A-3C may also be applicable to Lidar sensor data.

Subsequently, the geospatial engine 110 may determine GPS coordinates in a subsequent or previous frame that has missing or unreliable GPS data in a manner same or similar to that described in FIG. 2C or FIG. 3C.

Figure 5:
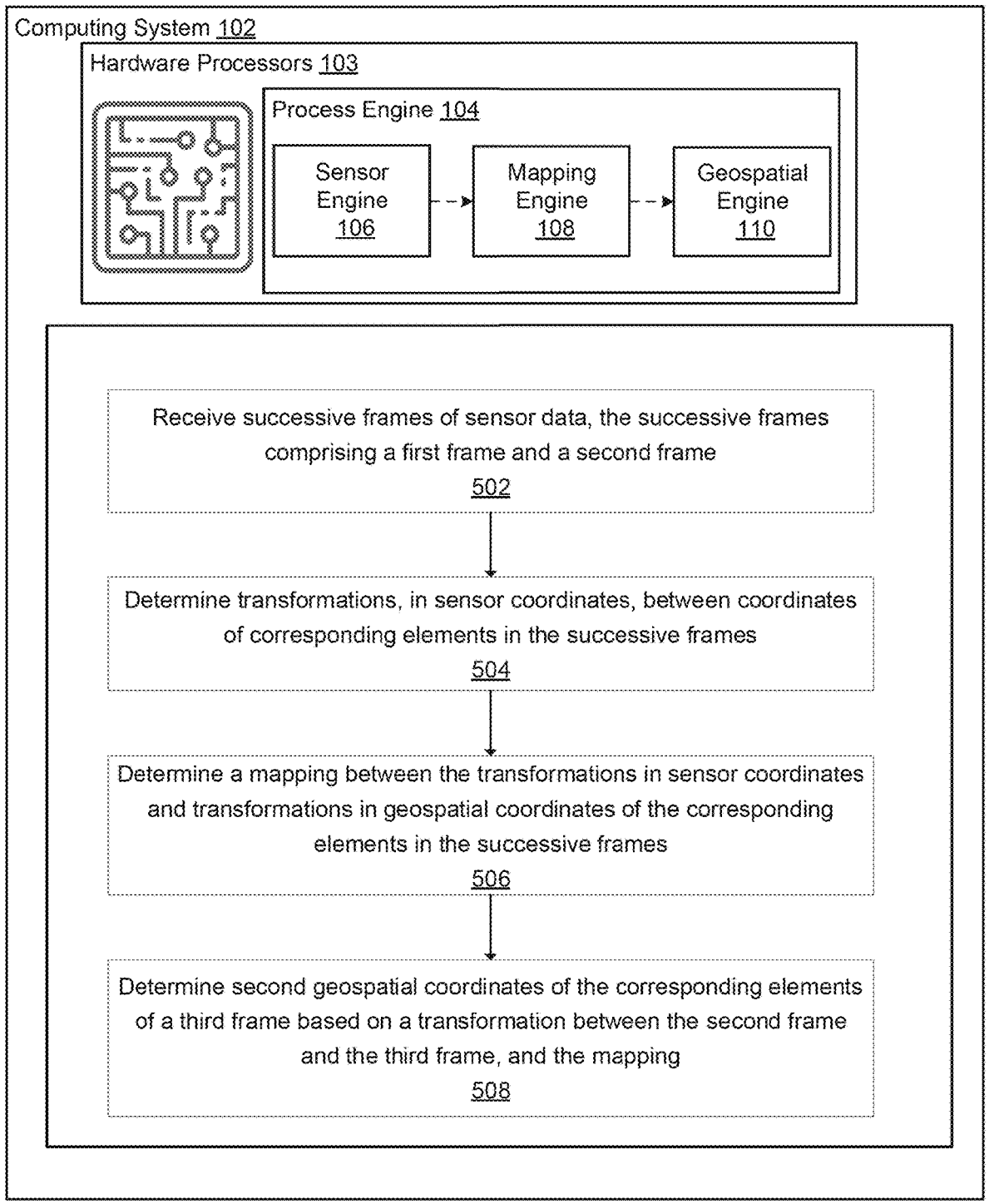
FIG. 5 illustrates a flowchart of an example method, in accordance with various embodiments of the present technology.

FIG. 5 illustrates a flowchart of an example method 500, according to various embodiments of the present disclosure. The method 500 may be implemented in various environments including, for example, the environments 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At step 502, the process engine 104 of the computing system 102 may receive successive frames of sensor data, the successive frames comprising a first frame and a second frame. At step 504, the process engine 104 may determine transformations, in sensor coordinates, between coordinates of corresponding elements in the successive frames. At step 506, the process engine 104 may determine a mapping between the transformations in sensor coordinates and transformations in geospatial coordinates of the corresponding elements in the successive frames. At step 508, the process engine 104 may determine second geospatial coordinates of the corresponding elements of a third frame based on a transformation between the second frame and the third frame, and the mapping.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 6:
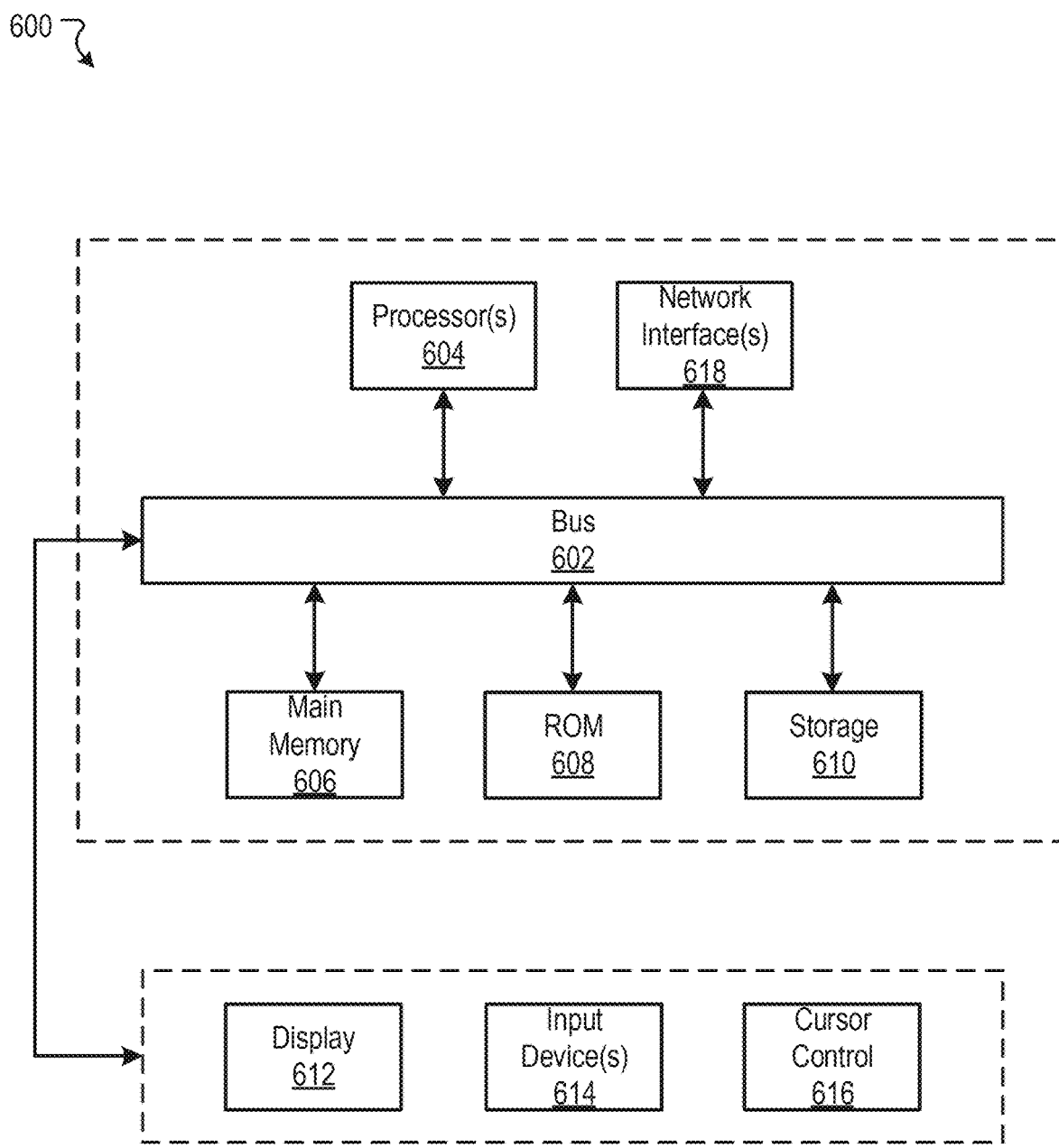
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

The invention claimed is:

1. A computing system comprising:
one or more processors; and
memory storing instructions that, when executed by the one or more processors, cause the system to perform:
receiving successive frames of sensor data, the successive frames comprising a first frame and a second frame;
determining transformations, in sensor coordinates, between coordinates of corresponding elements in the successive frames;
determining a mapping between the transformations in sensor coordinates and transformations in geospatial coordinates of the corresponding elements in the successive frames, wherein the determining of the mapping comprises:
determining first geospatial coordinates corresponding to a first time when the first frame was captured;
determining second geospatial coordinates corresponding to a second time when the second frame was captured, the mapping correlating a first angle and a first scaling factor in sensor coordinates to a second angle and a second scaling factor in geospatial coordinates; and
determining third geospatial coordinates of the corresponding elements of a third frame based on:
a transformation between the second frame and the third frame, and the mapping.

2. The computing system of claim 1, wherein the successive frames further comprise a fourth frame captured before the first frame, and the mapping is determined based on the transformations in sensor coordinates of the corresponding elements between the fourth frame and the first frame, and between the first frame and the second frame.

3. The computing system of claim 1, wherein the successive frames comprise previous frames captured before the first frame; and the mapping is determined based on an average of mappings determined between:
the previous frames, the first frame and a previous frame most recently captured before the first frame; and the first frame and the second frame.

4. The computing system of claim 1, wherein the first geospatial coordinates and the second geospatial coordinates comprise GPS (Global Positioning System) coordinates in longitude and latitude; and the determination of the third geospatial coordinates is in response to determining that a GPS signal is unavailable or inaccurate during the capturing of the third frame.

5. The computing system of claim 1, wherein the instructions further cause the system to perform:

determining that the corresponding elements are stationary; and the determination of the transformations is in response to determining that the corresponding elements are stationary.

6. The computing system of claim 1, wherein the instructions further cause the system to perform:

dividing each of the successive frames into segments, wherein the transformations are between the sensor coordinates of corresponding elements in each of the segments in the successive frames, wherein the mapping is between the transformations in the sensor coordinates and the transformations in the geospatial coordinates of the corresponding elements in each of the segments in the successive frames; and determining the third geospatial coordinates of the corresponding elements in each of the segments of the third frame based on:

the transformations of each of the segments between the second frame and the third frame, and the mapping; and the determination of the third geospatial coordinates of the third frame is based on a centroid of the determined third geospatial coordinates in each of the segments.

7. The computing system of claim 1, wherein the sensor data comprises camera data, infrared sensor data, or Lidar data.

8. The computing system of claim 7, wherein, in response to the sensor data comprising camera data, the elements comprise pixels.

9. The computing system of claim 1, wherein the determination of the mapping comprises an adjustment for a curvature of the Earth.

10. A computer-implemented method of a computing system, the method comprising:

receiving successive frames of sensor data, the successive frames comprising a first frame and a second frame;

determining transformations, in sensor coordinates, between coordinates of corresponding elements in the successive frames;

determining a mapping between the transformations in sensor coordinates and transformations in geospatial coordinates of the corresponding elements in the successive frames, wherein the determining of the mapping comprises:

determining first geospatial coordinates corresponding to a first time when the first frame was captured;

determining second geospatial coordinates corresponding to a second time when the second frame was captured, the mapping correlating a first angle and a first scaling factor in sensor coordinates to a second angle and a second scaling factor in geospatial coordinates; and determining third geospatial coordinates of the corresponding elements of a third frame based on:

a transformation between the second frame and the third frame, and the mapping.

11. The computer-implemented method of claim 10, wherein the successive frames further comprise a fourth frame captured before the first frame, and the mapping is determined based on the transformations in sensor coordinates of the corresponding elements between the fourth frame and the first frame, and between the first frame and the second frame.

12. The computer-implemented method of claim 10, wherein the successive frames comprise previous frames captured before the first frame; and the mapping is determined based on an average of mappings determined between:

the previous frames, the first frame and a previous frame most recently captured before the first frame; and the first frame and the second frame.

13. The computer-implemented method of claim 10, wherein the geospatial coordinates and the second geospatial coordinates comprise GPS (Global Positioning System) coordinates in longitude and latitude; and the determination of the third geospatial coordinates is in response to determining that a GPS signal is unavailable or inaccurate during the capturing of the third frame.

14. The computer-implemented method of claim 10, further comprising:

determining that the corresponding elements are stationary; and the determination of the transformations is in response to determining that the corresponding elements are stationary.

15. The computer-implemented method of claim 10, further comprising:

dividing each of the successive frames into segments, wherein the transformations are between the sensor coordinates of corresponding elements in each of the segments in the successive frames, wherein the mapping is between the transformations in the sensor coordinates and the transformations in the geospatial coordinates of the corresponding elements in each of the segments in the successive frames; and determining the third geospatial coordinates of the corresponding elements in each of the segments of the third frame based on:

the transformations of each of the segments between the second frame and the third frame, and the mapping; and the determination of the third geospatial coordinates of the third frame is based on a centroid of the determined third geospatial coordinates in each of the segments.

16. A non-transitory computer readable medium comprising instructions that, when executed, cause one or more processors to perform:

receiving successive frames of sensor data, the successive frames comprising a first frame and a second frame;

determining transformations, in sensor coordinates, between coordinates of corresponding elements in the successive frames;

determining a mapping between the transformations in sensor coordinates and transformations in geospatial coordinates of the corresponding elements in the successive frames, wherein the determining of the mapping comprises:
  determining first geospatial coordinates corresponding to a first time when the first frame was captured;
  determining second geospatial coordinates corresponding to a second time when the second frame was captured, the mapping correlating a first angle and a first scaling factor in sensor coordinates to a second angle and a second scaling factor in geospatial coordinates; and
determining third geospatial coordinates of the corresponding elements of a third frame based on:
  a transformation between the second frame and the third frame, and
  the mapping.

17. The non-transitory computer readable medium of claim 16, wherein the successive frames comprise previous frames captured before the first frame; and the mapping is determined based on an average of mappings determined between:
  the previous frames,
  the first frame and a previous frame most recently captured before the first frame; and
  the first frame and the second frame.

18. The non-transitory computer readable medium of claim 16, wherein the geospatial coordinates and the second geospatial coordinates comprise GPS (Global Positioning System) coordinates in longitude and latitude; and
  the determination of the second geospatial coordinates is in response to determining that a GPS signal is unavailable or inaccurate during the capturing of the third frame.

* * * * *